(12) United States Patent
Dhesi et al.

(10) Patent No.: US 8,261,093 B1
(45) Date of Patent: Sep. 4, 2012

(54) SYSTEM, METHOD, AND COMPUTER PROGRAM PRODUCT FOR DISABLING A COMMUNICATION CHANNEL DURING AUTHENTICATION

(75) Inventors: Rajkaran Singh Dhesi, Worthing (GB); Simon Hunt, Naples, FL (US); Paul Martin Parke, Brighton (GB)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 13/156,548

(22) Filed: Jun. 9, 2011

Related U.S. Application Data

(63) Continuation of application No. 12/056,931, filed on Mar. 27, 2008, now abandoned.

(51) Int. Cl.
G06F 21/00 (2006.01)
G06F 7/04 (2006.01)

(52) U.S. Cl. ............................................ 713/189; 726/4
(58) Field of Classification Search .................. 713/189; 726/4
See application file for complete search history.

(56) References Cited

U.S. PATENT DOCUMENTS

| | | | | |
|---|---|---|---|---|
| 4,759,062 A * | 7/1988 | Traub et al. | .................... | 713/184 |
| 6,618,810 B1 * | 9/2003 | Dirie | .............................. | 726/27 |
| 6,647,497 B1 * | 11/2003 | Cromer et al. | .................. | 726/16 |
| 7,725,592 B1 | 5/2010 | Hasegawa et al. | | |
| 7,730,521 B1 * | 6/2010 | Thesayi et al. | ..................... | 726/4 |
| 2003/0221114 A1 * | 11/2003 | Hino et al. | ..................... | 713/189 |
| 2007/0126562 A1 | 6/2007 | Ku | | |
| 2007/0224980 A1 * | 9/2007 | Wakefield | ..................... | 455/418 |
| 2007/0249286 A1 | 10/2007 | Ma et al. | | |
| 2008/0155661 A1 * | 6/2008 | Arashin et al. | ..................... | 726/4 |
| 2008/0166968 A1 | 7/2008 | Tang et al. | | |
| 2008/0214142 A1 | 9/2008 | Morin et al. | | |
| 2009/0168756 A1 * | 7/2009 | Kurapati et al. | .............. | 370/352 |
| 2009/0271846 A1 | 10/2009 | Desplanques et al. | | |
| 2009/0313689 A1 | 12/2009 | Nystrom et al. | | |
| 2010/0275010 A1 | 10/2010 | Ghirardi | | |

OTHER PUBLICATIONS

U.S. Appl. No. 12/056,907, filed Mar. 27, 2008.
U.S. Appl. No. 12/056,869, filed Mar. 27, 2008.
U.S. Appl. No. 12/056,837, filed Mar. 27, 2008.
Non Final Office Action mail date Dec. 13, 2010 received in corresponding U.S. Appl. No. 12/056,931.

* cited by examiner

*Primary Examiner* — Techane Gergiso
(74) *Attorney, Agent, or Firm* — Wong, Cabello, Lutsch, Rutherford & Brucculeri, L.L.P.

(57) ABSTRACT

A system, method, and computer program product are provided for disabling a communication channel during authentication. In operation, an authentication request for an authentication event is detected. Furthermore, a communication channel is disabled, in response to the authentication event.

18 Claims, 10 Drawing Sheets

SYSTEM, METHOD, AND COMPUTER PROGRAM PRODUCT FOR DISABLING A COMMUNICATION CHANNEL DURING AUTHENTICATION

CROSS REFERENCE TO RELATED APPLICATIONS

This application is a Divisional application of Continuation U.S. patent application Ser. No. 12/056,931, filed on Mar. 27, 2008, entitled "System, Method, and Computer Program Product for Disabling a Communication Channel During Authentication", which is hereby incorporated by reference and to which priority is claimed.

FIELD OF THE INVENTION

The present invention relates to information security, and more particularly to information security on mobile devices.

BACKGROUND

Mobile devices such as personal digital assistants (PDAs) and Smartphones are now often being used as a replacement for personal computers (PCs) and notebook PCs in many organizations. In many cases, sensitive information associated with the organization (e.g. files, folders, etc.) may be stored on these devices. Additionally, because mobile devices often have the ability to connect to network resources intermittently, monitoring the devices, corresponding software, and stored data is a daunting security management task.

Mobile devices by nature are small, easily misplaced, and are attractive to criminal elements looking for sensitive information on unprotected machines. Thus, sensitive business information and real documents are now at risk and the threats that need to be addressed with these converged devices are nearly equivalent to those of the PC. However, mobile devices often offer separate and additional functionality not found on PCs that should also be considered when addressing information security issues.

There is thus a need for overcoming these and/or other issues associated with the prior art.

SUMMARY

A system, method, and computer program product are provided for disabling a communication channel during authentication. In operation, an authentication request for an authentication event is detected. Furthermore, a communication channel is disabled, in response to the authentication event.

DETAILED DESCRIPTION

Figure 1:
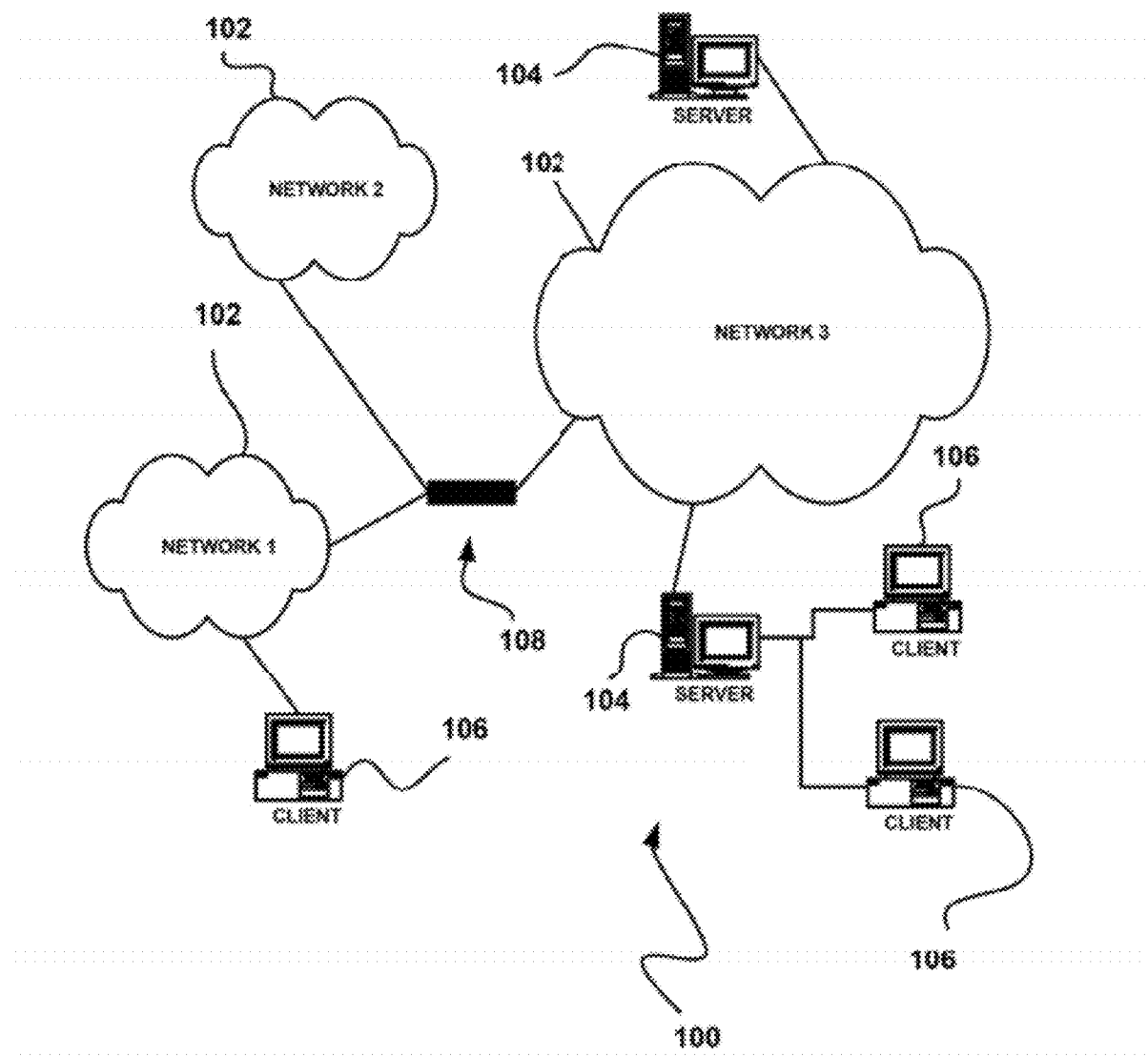
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
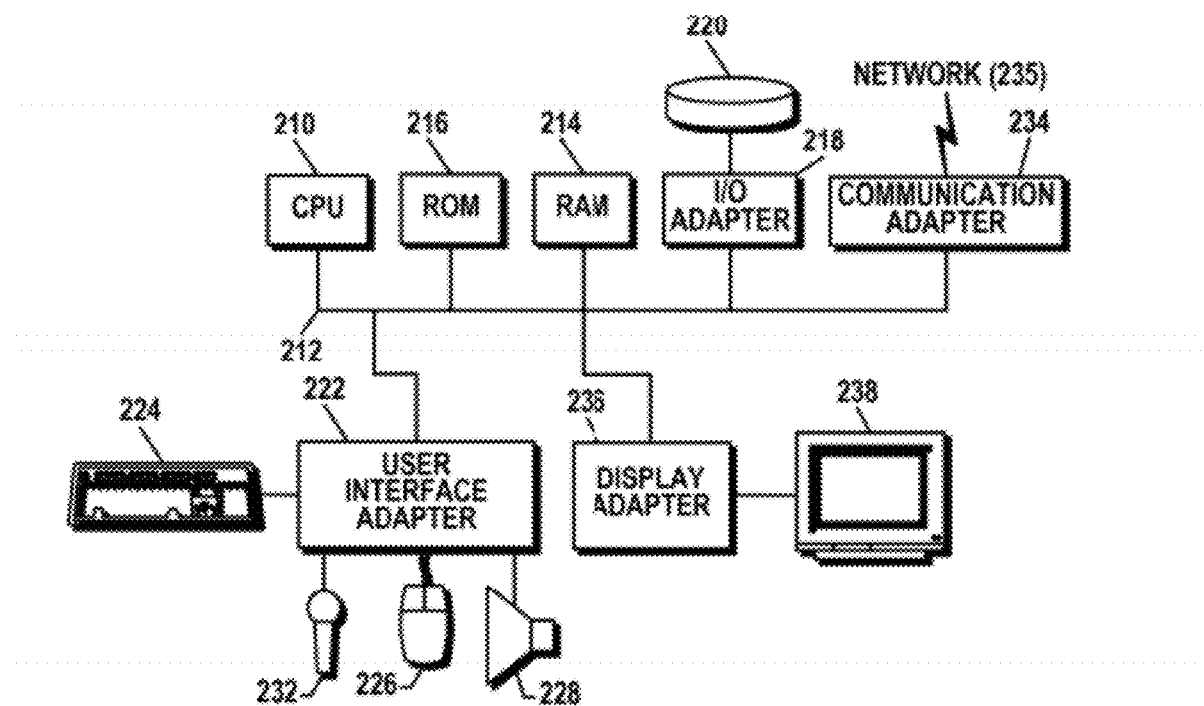
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
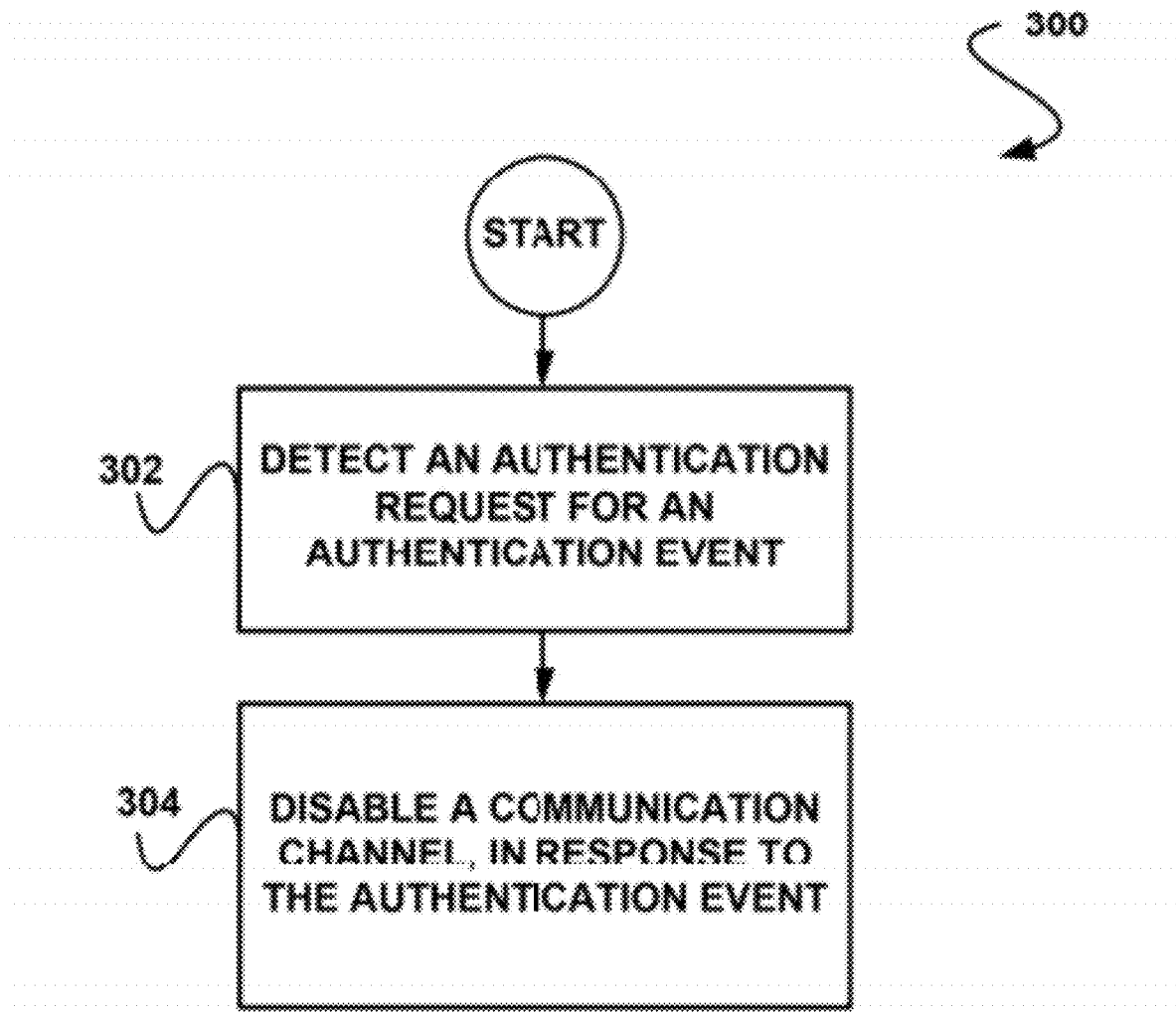
FIG. 3 shows a method for disabling a communication channel during authentication, in accordance with one embodiment.

FIG. 3 shows a method 300 for disabling a communication channel during authentication, in accordance with one embodiment. As an option, the method 300 may be implemented in the context of the architecture and environment of FIGS. 1 and/or 2. Of course, however, the method 300 may be carried out in any desired environment.

In operation, an authentication request for an authentication event is detected. See operation 302. In the context of the present description, an authentication event refers to any event associated with an authentication process. For example, in various embodiments, the authentication event may include, but is not limited to, an authentication of a user, a re-authentication of a user, a verification of a user, a re-verification of a user, and/or any other authentication event that meets the above definition.

Furthermore, a communication channel is disabled, in response to the authentication event. See operation 304. In the context of the present description, a communication channel refers to any channel from which communication may be facilitated. For example, in various embodiments, the communication channel may include, but is not limited to, a wireless communication channel, a Bluetooth communication channel, a communication channel adapted for communication with a headset, and/or any other communication channel that meets the above definition.

As an option, the detecting of the authentication request and the disabling of the communication channel may be carried out utilizing a mobile device. In this case, a device refers to any device capable of being accessed by a user. For example, in various embodiments, the device may include, but is not limited to, a mobile phone, a PDA, a handheld computer, and/or any other device that meets the above definition. In one embodiment, the mobile device may include security computer code for encrypting memory on the mobile device. In this case, the security computer code may perform the detecting and the disabling.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
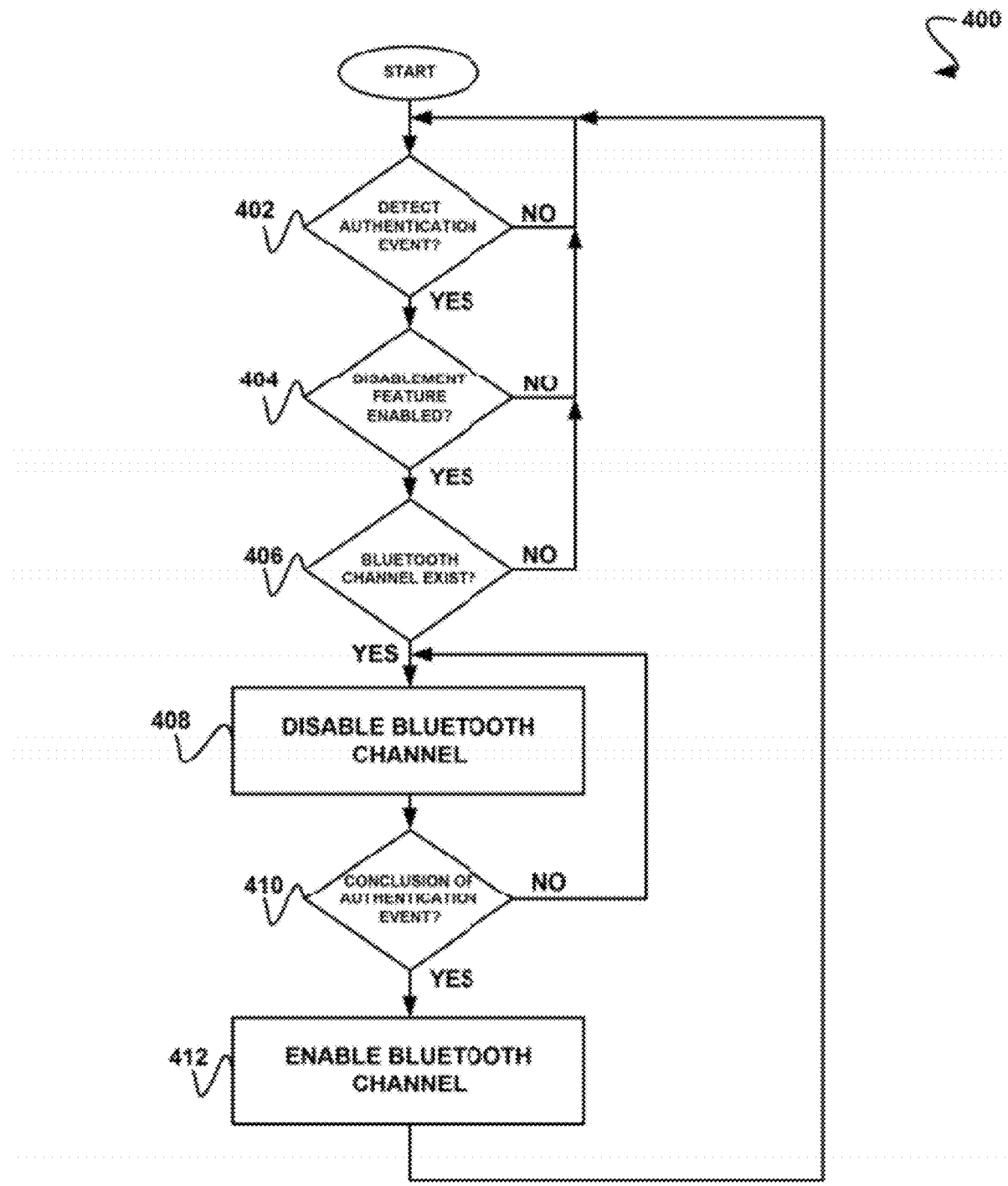
FIG. 4 shows a method for disabling a communication channel during authentication, in accordance with another embodiment.

FIG. 4 shows a method 400 for disabling a communication channel during authentication, in accordance with another embodiment. As an option, the method 400 may be implemented in the context of the architecture and environment of FIGS. 1-3. Of course, however, the method 400 may be carried out in any desired environment. It should also be noted that the aforementioned definitions may apply during the present description.

As shown, it is determined whether an authentication event is detected. See operation 402. In this case, the authentication event may be detected as a result of receiving an authentication request. In one embodiment, the authentication request may include a user request.

For example, a user may attempt to use a mobile device which requires authentication before some or all functionality associated with the device may be utilized. In this case, an authentication interface may be displayed for prompting a user for authentication information, in response to the authentication event. In one embodiment, the authentication information may include a password and/or other authentication information.

If an authentication event is detected, it is determined whether a communication channel disablement feature is enabled. See operation 404. As an option, the communication channel disablement feature may be enabled utilizing a graphical user interface. For example, a user (e.g. an administrator) may have the ability to enable/disable communication channel disablement functionality using the interface.

If it is determined that the communication channel disablement feature is enabled, it is determined whether a communication channel exists. See operation 406. For example, it may be determined whether a Bluetooth channel or another communication channel exists.

If it is determined that a communication channel exists, the communication channel is disabled. See operation 408. In some cases, the communication channel may have been operable before the authentication event was detected.

The communication channel may be disabled for a variety of reasons. For example, the communication channel may be disabled in order to protect files/folders that are being encrypted or decrypted as part of the authentication event. As another option, the communication channel may be disabled to protect any vulnerable file during an authentication process.

Once the communication channel is disabled, it is determined whether a conclusion of the authentication event has been detected. See operation 410. In one embodiment, the conclusion of the authentication event may include a successful authentication of the user on the device. In another embodiment, the conclusion of the authentication event may include an unsuccessful authentication of the user on the device followed by the return to a pre-authentication interface which allows some of the device functionality.

If it is determined that the authentication event has concluded, the communication channel is enabled. See operation 412. In one embodiment, the communication channel may be conditionally operable after the authentication event, based on results of the authentication event.

For example, if the authentication event fails, it may be determined that the communication channel remain disabled. On the other hand, if the authentication event passes, it may be determined that the communication channel is to be enabled. Of course, as an option, the communication channel may be enabled regardless of the result of the authentication event.

Figure 5:
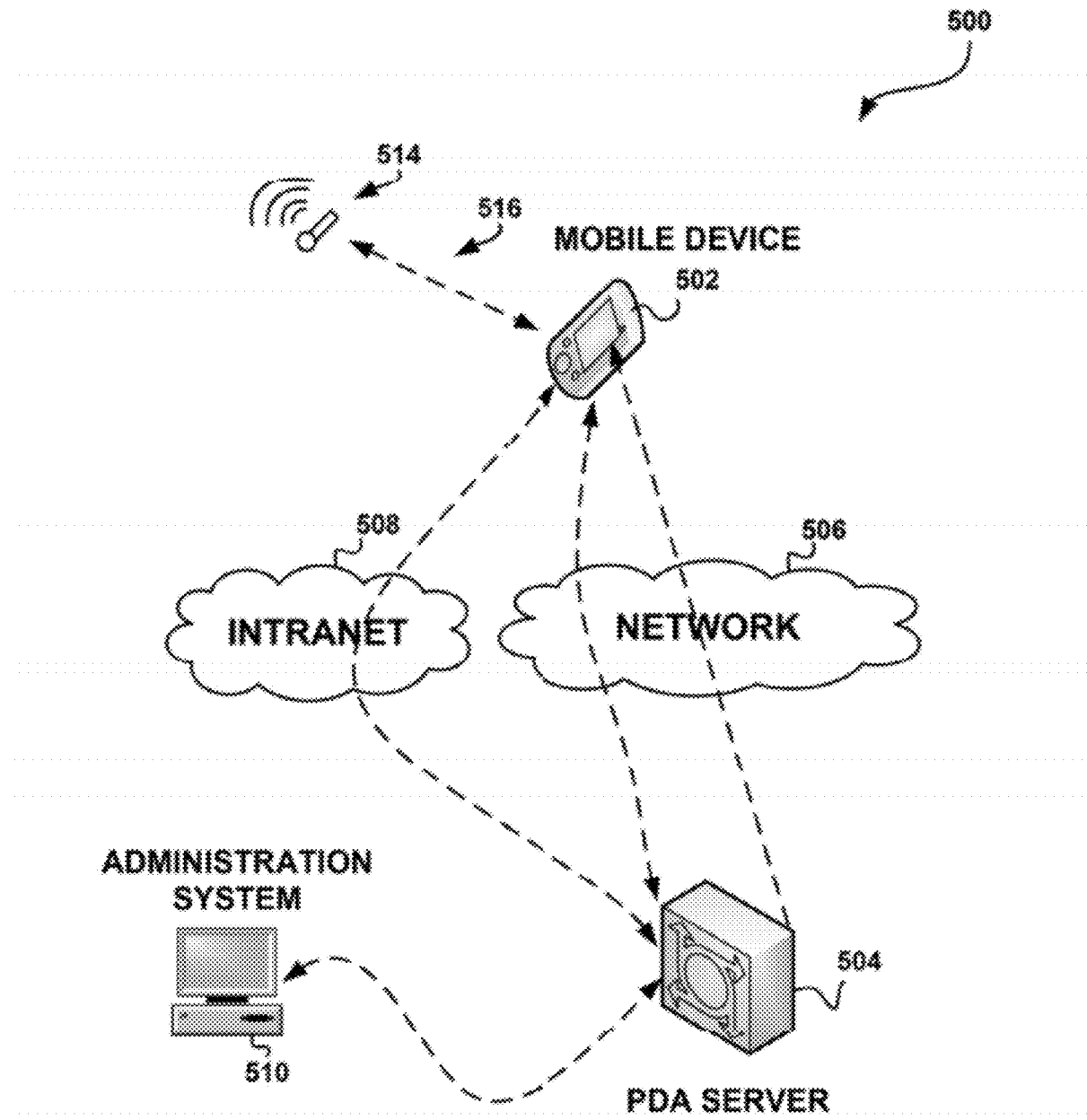
FIG. 5 shows a system for disabling a communication channel during authentication, in accordance with another embodiment.

FIG. 5 shows a system 500 for disabling a communication channel during authentication, in accordance with another embodiment. As an option, the system 500 may be implemented in the context of the architecture and environment of FIGS. 1-4. Of course, however, the system 500 may be implemented in any desired environment. Again, the aforementioned definitions may apply during the present description.

As shown, a mobile device 502 is in communication with a server 504 over a network 506. As shown further, the mobile device 502 may also be in communication with the server 504 over a network 508. Furthermore, an administration system 510 capable of configuring the server 504 and/or the mobile device 502 is also provided. As an option, the administration system 510 may communicate with the server 504 over a network or a direct link.

In operation, the mobile device 502 may be capable of displaying a pre-authentication interface such that the mobile device 502 permits data entry prior to a user being authenticated on the mobile device 502. As an option, the mobile device 502 may be capable of communicating with and/or using functionality associated with the server 504 through the pre-authentication screen. For example, the mobile device 502 may have the ability to send text messages to certain contacts or numbers via the using the pre-authentication screen.

In one embodiment, the user may be restricted from accessing files stored on the server 504 and/or the mobile device 502 before the user is authenticated on the mobile device 502. For example, the pre-authentication screen may only allow the user access to the server 504 and/or the mobile device 502 for authentication purposes and minimal device functionality. In other words, the user may not have the ability to access the server 504 and/or files on the mobile device 502 using the pre-authentication interface for any other function than authentication and limited calling/messaging (e.g. emergency calling/messaging, etc.).

In another embodiment, the user may have access to only certain content corresponding to the server 504 and/or the mobile device 502 using the pre-authentication interface of the mobile device 502. For example, the user may have access to non-restricted files associated with the server 504 and/or the mobile device 502. As another option, the user may have access to certain applications associated with the server 504 and/or the mobile device 502 using the pre-authentication interface. Upon authentication, a user may have full access to functionally associated with the mobile device 502, as well as corresponding files and folders.

As shown further in FIG. 5, a Bluetooth device 514 may also be provided, the Bluetooth device being capable of communicating with the mobile device 502 via a communication channel 516. In use, the user may initiate an authentication event on the mobile device 502. In response to the initiation of the authentication event, the communication channel 516 is disabled such that the Bluetooth device 514 is incapable of communication with the mobile device 502 until the authentication event has concluded.

In various embodiments, the authentication event may include, but is not limited to, an authentication request, a mode change, a power-up, a time-out, and/or any other authentication event. For example, a user may initiate an authentication event by selecting an authentication interface option from a pre-authentication interface and attempt to be authenticated by entering a password. During authentication, the communication channel 516 may be disabled such that the Bluetooth device 514 is incapable of communicating with the mobile device 502 until the authentication event has concluded.

In this case, the Bluetooth device 514 may have been in communication with the mobile device 502 via the communication channel 516 before the detection of the authentication event. Upon conclusion of the authentication event, the Bluetooth device 514 may once again communicate with the mobile device 502 via the communication channel 516. As an option, the disablement of the communication channel 516 may be configured by an administrator using an interface associated with the administration system 510.

In this way, the administrator may centrally manage disablement configurations for a plurality of devices communicating with the server 504. Thus, each of the devices may be configured upon synchronization with the server 504.

Figure 6:
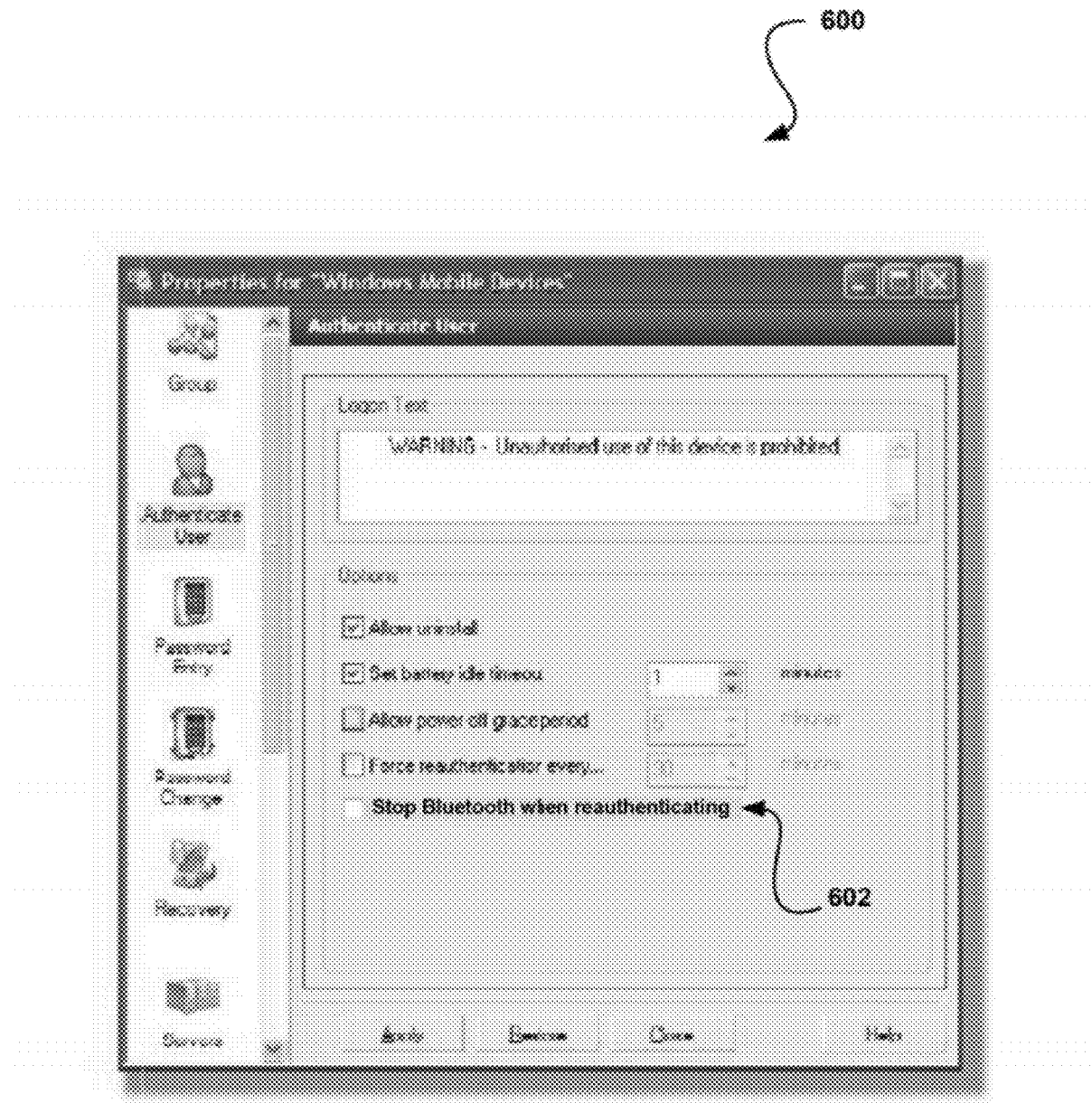
FIG. 6 shows a graphical user interface for configuring the disablement of a communication channel during authentication, in accordance with another embodiment.

FIG. 6 shows a graphical user interface 600 for configuring the disablement of a communication channel during authentication, in accordance with another embodiment. As an option, the interface 600 may be implemented in the context of the architecture and environment of FIGS. 1-5. Of course, however, the interface 600 may be implemented in any desired environment. It should also be noted that the aforementioned definitions may apply during the present description.

As shown, the interface 600 may include a selection box 602 such that a user (e.g. an administrator) may configure a device to disable a communication channel when authentication event is detected. It should be noted that the disablement of the communication channel may be configured to occur upon an initial authentication event and/or a re-authentication event. Using the interface 600, an administrator may ensure that all devices associated with an organization disable communication channels when an authorization event is detected.

Figure 7:
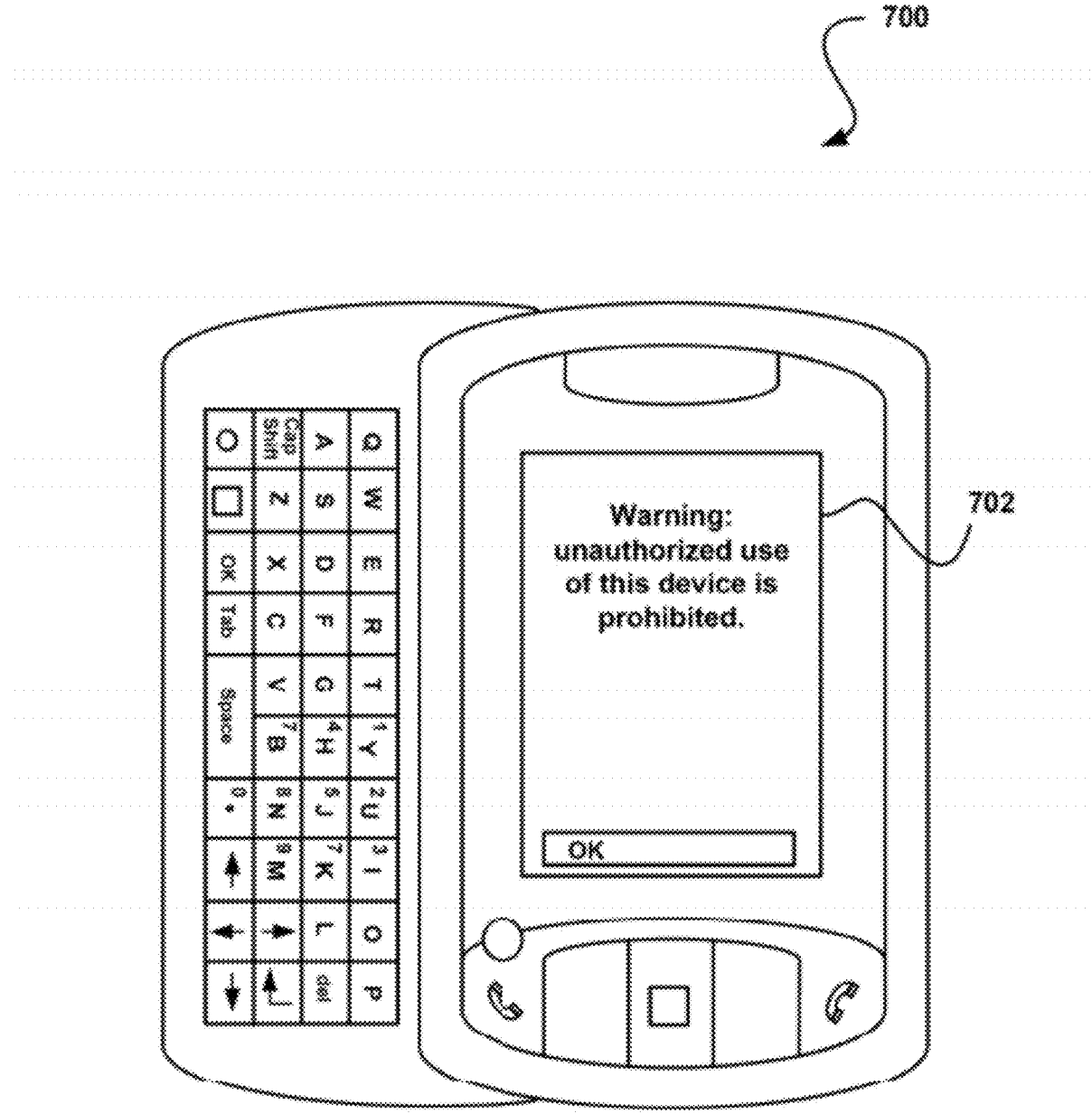
FIG. 7 shows a mobile device including a pre-authentication interface for permitting data entry, in accordance with another embodiment.

FIG. 7 shows a mobile device 700 including a pre-authentication interface 702 for permitting data entry, in accordance with another embodiment. As an option, the mobile device 700 may be implemented in the context of the architecture and environment of FIGS. 1-6. Of course, the mobile device 700 may be implemented in any desired environment. Further, the aforementioned definitions may apply during the present description.

As an option, the mobile device 700 may include a client application which allows administrators to secure a mobile device population of an organization (e.g. PDAs, Smartphones, etc.). In particular, the client application may allow the protection of sensitive information stored on the device 700. In one embodiment, the client application may protect mobile devices running Windows Mobile software.

In operation, the client application may encrypt files, folders and databases such that they cannot be accessed unless a user of the device 700 can authenticate properly with a password. The encryption/decryption process may be carried out transparently to the end user and will not affect the normal operation of the mobile device 700 after the user has logged on.

As shown, configurable warning/informational text may be displayed using the pre-authentication interface 702. As an option, the warning/informational text may be defined by an administrator. In this case, the warning/informational text may be configured on a server that is in communication with the mobile device 700. Using this server, a plurality of mobile devices may be synchronized such that the same warning/informational text may be displayed on the plurality of mobile devices. As an option, the warning/informational text may always be displayed on the pre-authentication interface 702 prior to logging on to the mobile device 700. In the case that no warning/informational text has been configured and/or defined, default text or an authentication screen may be displayed on the pre-authentication interface 702.

In one embodiment, Bluetooth functionality may be allowed using the pre-authentication interface 702. Upon the detection of an authentication event, the Bluetooth functionality may be disabled until the authentication event is complete.

Figure 8:
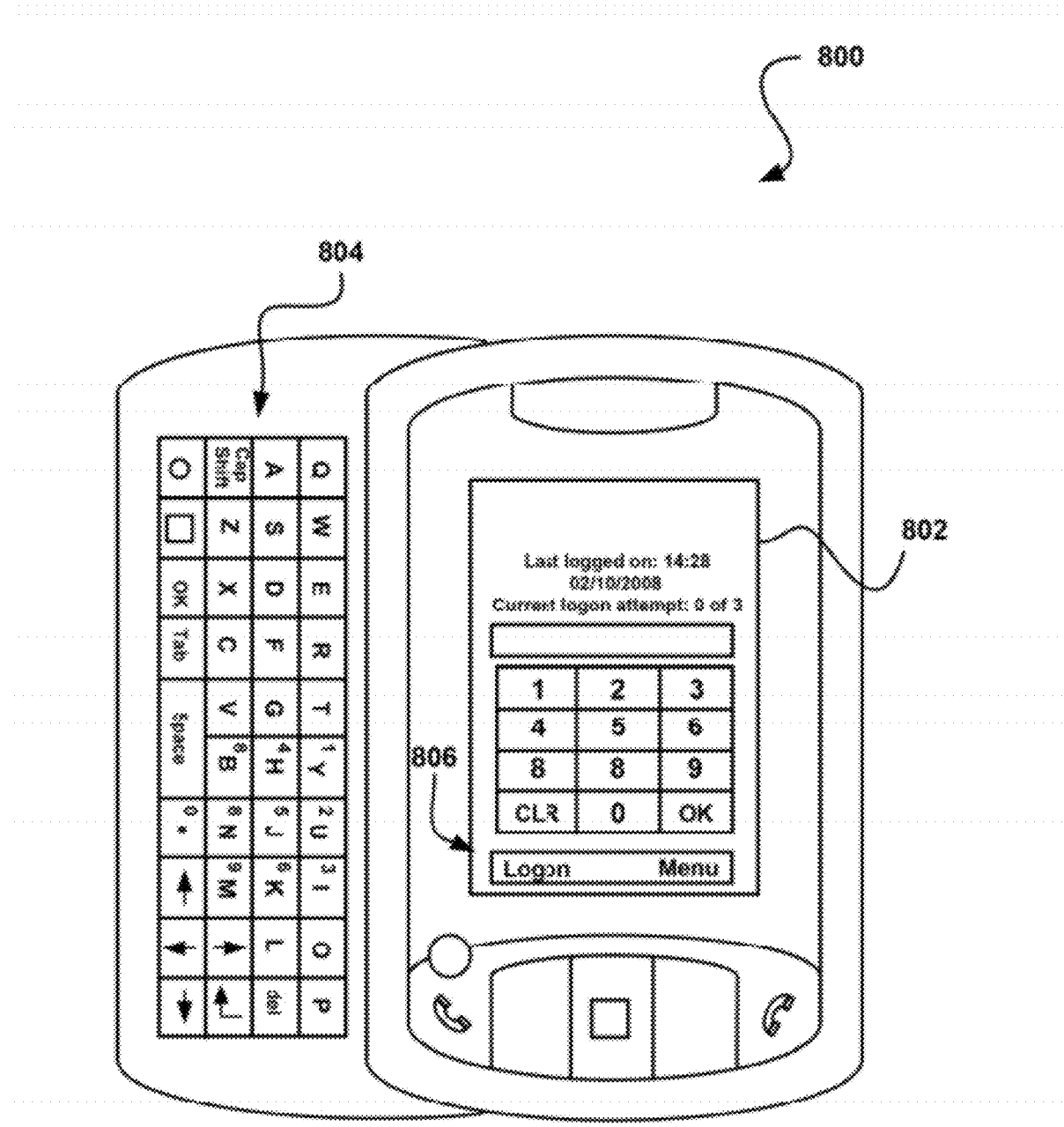
FIG. 8 shows a mobile device including an authentication interface, in accordance with another embodiment.

FIG. 8 shows a mobile device 800 including an authentication interface 802, in accordance with another embodiment. As an option, the mobile device 800 may be implemented in the context of the architecture and environment of FIGS. 1-7. Of course, the mobile device 800 may be implemented in any desired environment. It should also be noted that the aforementioned definitions may apply during the present description.

As shown, the authentication interface 802 may provide information associated with the last time the mobile device 800 was successfully logged on, as well as information about failed login attempts. As an option, such as on smaller display screens, the mobile device 800 may automatically cycle between the information showing the last logon and the information about failed login attempts. As shown further, the authentication interface 802 may be configured to display a PIN pad or an on-screen keyboard. Using the PIN pad, the on-screen keyboard, or a keyboard 804 corresponding to the mobile device 800, a user may enter a password and press a logon button 806 in order to authenticate on the device 800.

As an option, the authentication interface 802 may further include configurable warning/informational text.

Figure 9:
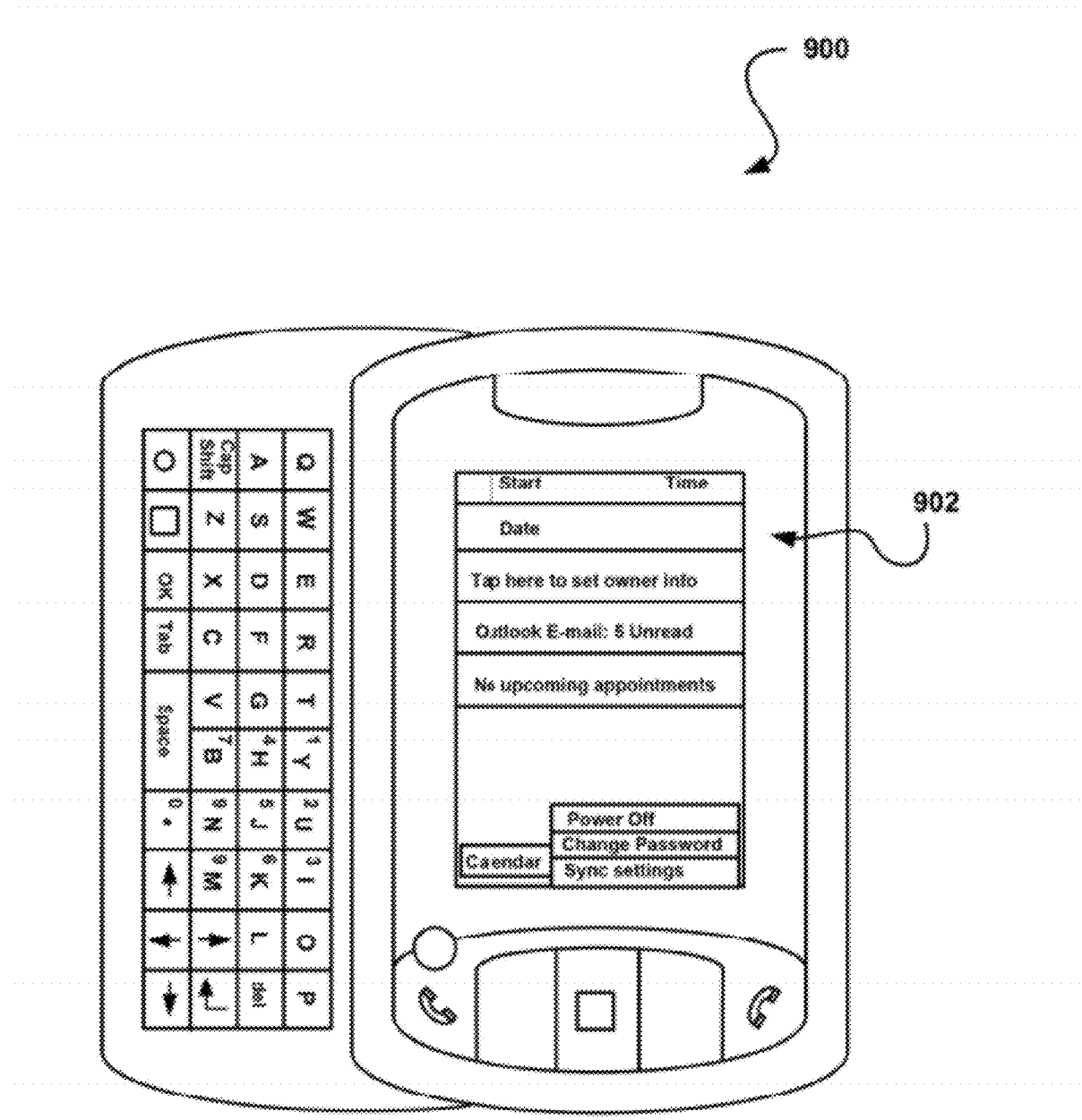
FIG. 9 shows a mobile device including a post-authentication interface provided after authentication of a user, in accordance with another embodiment.

FIG. 9 shows a mobile device 900 including a post-authentication interface 902 provided after authentication of a user, in accordance with another embodiment. As an option, the mobile device 900 may be implemented in the context of the architecture and environment of FIGS. 1-8. Of course, however, the mobile device 900 may be implemented in any desired environment. Again, the aforementioned definitions may apply during the present description.

As shown, the post-authentication interface 902 may provide access to various files, folders, and applications on the mobile device 900. As noted above, an application included on the mobile device 900 may have encrypted one or more files and folders on the mobile device 900. This prevents anyone other than an authorized user from accessing a calendar, tasks, email messages, etc. stored on or accessed by the mobile device 900.

Once authenticated on the mobile device 900, the post-authentication interface 902 may allow the use and access of this functionality and access to the files and folders inaccessible from a pre-authentication interface. In this way, the pre-authentication interface may be utilized for data entry and performing basic functionality using the mobile device 900, while limiting access to restricted data or certain functionality associated with the mobile device 900. On the other hand, the post-authentication interface 902 may allow an authenticated user to access all files, folders, and applications associated with the mobile device 900.

Figure 10:
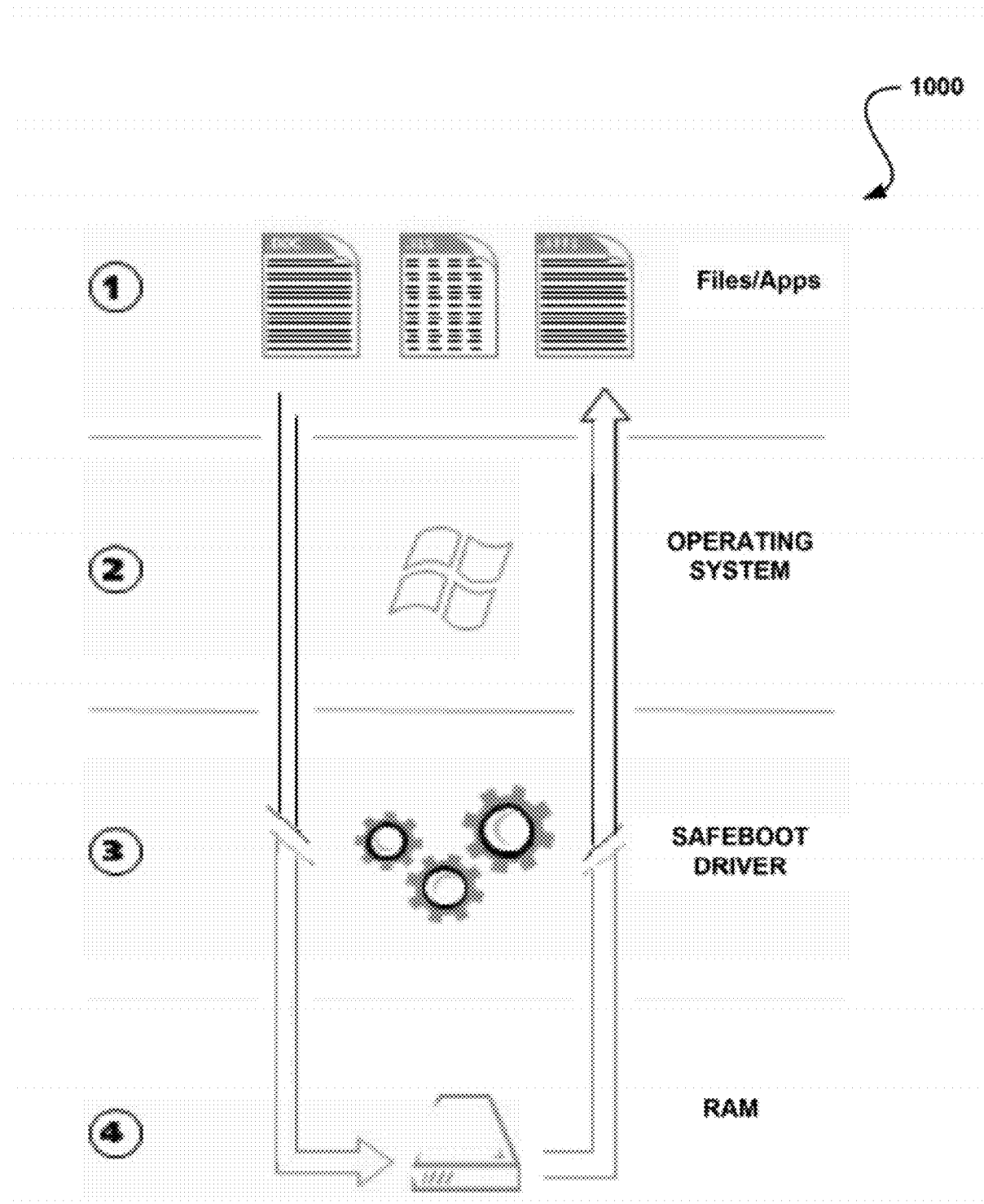
FIG. 10 shows a method for encrypting/decrypting files, in accordance with another embodiment.

FIG. 10 shows a method 1000 for encrypting/decrypting files, in accordance with another embodiment. As an option, the method 1000 may be implemented in the context of the architecture and environment of FIGS. 1-9. Of course, however, the method 1000 may be carried out in any desired environment. It should also be noted that the aforementioned definitions may apply during the present description.

As shown, when a user has been authenticated on a mobile device, files are in plain text and fully viewable by the authorized user(s) and applications(s). For encryption purposes, the files are translated into sectors and the sectors are encrypted in memory. The sectors may then be stored in non-volatile RAM (random access memory) of the mobile device.

In various embodiments, the encryption may occur on power down of the device, a logout, a mode change, a time out, or any other event where encryption may be desired. Using this encryption, non-authorized users may be restricted from access to files. Thus, a user may be required to enter authentication information on an authentication screen to decrypt the files.

Upon authentication, the sectors are read from the non-volatile RAM of the mobile device. The encrypted sectors may then be decrypted in memory and assembled into files. Upon assembly, the files may once again be fully viewable by the authorized user(s) and applications(s).

In one embodiment, the encryption may include a fully transparent Advanced Encryption Standard (AES) Federal Information Processing Standards (FIPS) 256 bit encryption. In various embodiments, the encryption may include encrypting specified files/folders, e-mails, encryption of standard application databases such as contacts, calendars, speed dials, appointments, tasks, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A mobile device comprising:
a memory configured to store security computer code; and
a microprocessor coupled to the memory and configured to execute the security computer code;
wherein execution of the security computer code causes the mobile device to:
encrypt data stored in a memory of the device in response to a power down of the device, a logout, or a time out, such that the data is inaccessibble unless a user of the device successfully authenticates;
disable a communication channel during and in response to an authentication event to protect the data being encrypted or decrypted as part of the authentication event; and
re-enable the communication channel upon conclusion of the authentication event.

2. The mobile device of claim 1 wherein the disabled communication channel comprises a Bluetooth connection.

3. The mobile device of claim 1 wherein the computer security code is further configured to allow an administrator to remotely configure the disablement of the communication channel during the authentication event.

4. The mobile device of claim 1 wherein the security computer code is further configured to place the communication channel in a conditionally operable state after the authentication event based on the results of the communication event.

5. The mobile device of claim 4, wherein the security computer code is further configured to leave the communication channel disabled if the authentication fails.

6. The mobile device of claim 1 wherein the mobile device is configured to display a pre-authentication interface such that the mobile device permits data entry prior to a user being authenticated on the mobile device.

7. The mobile device of claim 6 wherein the mobile device is configured to communicate with a server or use functionality associated with the server through the pre-authentication interface.

8. The mobile device of claim 7 wherein the security computer code is further configured to restrict user access to data stored on the server or on the mobile device before the user is authenticated on the mobile device.

9. The mobile device of claim 6 wherein the mobile device is further configured to display a post-authentication interface providing access to various files, folders, and applications on the mobile device including data encrypted and inaccessible prior to the authentication event.

10. An administration system comprising: a computer hardware configured to communicate with one or more mobile devices and one or more servers over a network, wherein the administration system comprises an interface permitting an administrator to configure the one or more mobile devices to:
disable a communication channel of one or more of the mobile devices during and in response to an authentication event to protect data being encrypted or decrypted as part of the authentication event; and
re-enable the communication channel upon conclusion of the authentication event.

11. The administration system of claim 10 wherein disablement of the communication channel is configured to occur upon an initial authentication event.

12. The administration system of claim 11 wherein the disablement of the communication channel is further configured to occur upon a re-authentication event.

13. A method of securing a mobile device, the method comprising:
- executing code on the mobile device to encrypt data stored in the device's memory in response to a power down of the device, a logout, or a time out, such that the data is inaccessible unless a user of the device successfully authenticates;
- executing code on the mobile device to disable a communication channel during and in response to an authentication event to protect the data being encrypted or decrypted as part of the authentication event; and
- executing code on the mobile device to re-enable the communication channel upon conclusion of the authentication event.

14. The method of claim 13 wherein the mobile device is instructed to perform the encryption, disablement of the communication channel, and re-enablement of the communication channel by an administration system.

15. The method of claim 13 wherein the code further causes the mobile device to display a pre-authentication interface such that the mobile device permits data entry prior to a user being authenticated on the mobile device.

16. The method of claim 15 wherein the code further causes the mobile device to communicate with a server or use functionality associated with the server through the pre-authentication interface.

17. The method of claim 16 wherein the code further causes the mobile device to restrict user access to data stored on the server or on the mobile device before the user is authenticated on the mobile device.

18. The method of claim 15 wherein the code further causes the mobile device to display a post-authentication interface providing access to various files, folders, and applications on the mobile device including data encrypted and inaccessible prior to the authentication event.

* * * * *